United States Patent [19]

Isobe

[11] Patent Number: 5,546,915
[45] Date of Patent: Aug. 20, 1996

[54] EXHAUST GAS RECIRCULATING SYSTEM WITH REDUCED DEPOSIT

[75] Inventor: Daiji Isobe, Toyohashi, Japan

[73] Assignee: Nippondenso Co., Ltd., Kariya, Japan

[21] Appl. No.: 510,670

[22] Filed: Aug. 3, 1995

[30] Foreign Application Priority Data

Aug. 25, 1994 [JP] Japan ..................... 6-225892

[51] Int. Cl.⁶ ........................................ F02M 25/07
[52] U.S. Cl. .............................. 123/570; 123/571
[58] Field of Search .................... 123/568, 569, 123/570, 571, 676

[56] References Cited

U.S. PATENT DOCUMENTS

| | | | |
|---|---|---|---|
| 4,735,186 | 4/1988 | Parsons | 123/570 |
| 4,793,318 | 12/1988 | Tsurusaki | 123/571 |
| 4,834,054 | 5/1989 | Hashimoto et al. | 123/571 |
| 4,870,941 | 10/1989 | Hisatomi | 123/571 |
| 4,870,942 | 10/1989 | Shibata et al. | 123/676 |
| 4,879,986 | 11/1989 | Sakamoto | 123/571 |
| 5,309,886 | 5/1994 | Hitomi et al. | 123/570 |
| 5,440,880 | 8/1995 | Ceynow et al. | 123/570 |

FOREIGN PATENT DOCUMENTS

| | | |
|---|---|---|
| 55-17678 | 2/1980 | Japan . |
| 4287858 | 10/1992 | Japan . |

*Primary Examiner*—Willis R. Wolfe
*Attorney, Agent, or Firm*—Cushman, Darby & Cushman

[57] ABSTRACT

An EGR valve in an EGR passage is provided with an EGR gas temperature sensor. When a detected EGR gas temperature is within a deposit generating temperature range, the opening of the EGR valve is corrected to the OPEN side to increase the EGR flow rate, and thereby the temperatures of the inside wall of the EGR passage and the EGR valve are quickly raised. Therefore, the heat radiation (temperature fall) of the EGR gas can be reduced and the EGR gas temperature is raised to or higher than the deposit generation temperature range. The accumulation of deposit on the inside wall of the EGR passage, a valve element of the EGR valve, etc. can be restrained. The EGR gas temperature may be estimated from engine conditions and the opening of the EGR valve.

6 Claims, 6 Drawing Sheets

EXHAUST GAS RECIRCULATING SYSTEM WITH REDUCED DEPOSIT

CROSS REFERENCE TO RELATED APPLICATION

This application is based on and claims priority of Japanese Patent Application No. 6-225892 filed on Aug. 25, 1994, the content of which is incorporated herein by reference.

BACKGROUND OF THE INVENTION

1. Field of the Invention

The present invention generally relates to an exhaust gas recirculating system, and more particularly to an exhaust gas recirculating system (EGR system) for purifying exhaust gas emitted from an exhaust system of an internal combustion engine by recirculating a part of the exhaust gas to an intake system.

2. Description of Related Art

The conventional exhaust gas recirculating system includes a recirculation control valve (EGR valve) on the way within an exhaust gas recirculation piping for recirculating a part of an exhaust gas emitted from an exhaust system to an intake system and regulates the recirculation gas flow rate by controlling the opening of the recirculation control valve according to the intake negative pressure, exhaust back pressure, etc. However, carbon component, etc. contained in the recirculation gas accumulates as a deposit on the valve element of the recirculation control valve and the inside wall of the exhaust gas recirculation piping. Particularly, within a deposit generation temperature range equal to or lower than approximately 110° C., the deposit accumulation becomes large. If the deposit accumulates to an excessive level, even if the opening of the recirculation control valve is controlled to the target opening, the recirculation gas flow rate will not reach the target value or the closing ability of the recirculation control valve will degrade and gas leak through the valve when the recirculation control valve is closed will increase, exerting adverse effect on the engine horsepower, fuel efficiency and drivability.

In order to solve these problems, there has been disclosed a technique in the Japanese Unexamined Patent Publication No. 55-17678 in which a primary air introduction passage for introducing the primary air into an intake system is also used as the passage of the recirculation control valve and a speed reduction control valve is added to the recirculation control valve so that the deposit accumulated on the valve element of the recirculation control valve, etc. can be purged by the intake air pressure by the opening of the speed reduction control valve and the intake of the primary air to the intake side through the recirculation control valve when the engine is at deceleration.

However, according to the conventional construction in which the speed reduction control valve is added to the recirculation control valve and both valves are controlled, the construction is complicated and the manufacturing cost is high, and the demand for a compact construction can not be satisfied. Particularly, when it is so constructed that the exhaust gas is purified by the recirculation of a part of the exhaust gas even within the low water temperature range, the temperature of the recirculation gas flowing within the exhaust gas recirculation piping is low according to the conventional construction. As a result, the accumulation of the deposit increases so remarkably that the deposit can not sufficiently be removed by the intake air pressure alone.

SUMMARY OF THE INVENTION

It is a primary object of the present invention to provide an exhaust gas recirculating system which can satisfy the demand for a simple and compact construction, restrain the deposit accumulation even with the exhaust gas recirculation within the low water temperature range, and expand the exhaust gas recirculation control range (EGR control range).

According to the present invention, the temperature of a recirculation gas flowing within an exhaust gas recirculation passage is determined by recirculation gas temperature determining means, and when the recirculation gas temperature is within the deposit generation temperature range, the recirculation gas temperature is so controlled as to rise to or higher than the deposit generation temperature by the recirculation gas temperature rise controlling means. Thus, the deposit generation temperature range is evaded and the exhaust gas recirculation control (EGR control) is executed.

Preferably, the recirculation gas temperature determining means is so arranged that the recirculation gas temperature is directly detected based on the output signal from the recirculation gas temperature detecting means provided within the exhaust gas recirculation passage or a recirculation control valve, the recirculation gas temperature can be determined with a higher precision.

Also, as the recirculation gas temperature varies depending on the engine operating condition, such as engine rotational speed, intake pressure and cooling water temperature, and the opening of the recirculation control valve, if the correlations between these factors are obtained beforehand through experiments or theoretical analysis, it is possible to estimate the recirculation gas temperature from the engine operating condition, such as engine rotational speed, intake pressure and cooling water temperature, and the opening of the recirculation control valve.

Accordingly, the recirculation gas temperature may be estimated based on the output signals from various sensors for detecting the engine operating condition, such as engine rotational speed, intake pressure, and cooling water temperature, and the opening of the recirculation control valve. As the data used for the control of the internal combustion engine can also be used as the data of the engine operating condition, such as engine rotational speed, intake pressure and cooling water temperature, there is no need to provide any additional sensor and the manufacturing cost can be reduced.

Furthermore, when the recirculation gas temperature is within the deposit generation temperature range, the opening of the recirculation control valve is corrected to the OPEN side to increase the recirculation gas flow rate. As a result, the temperature of the inside wall of the exhaust gas recirculation passage and the temperature of the recirculation control valve quickly rise due to a large amount of the recirculation gas heat, the heat radiation (temperature fall) from the recirculation gas flowing within the exhaust gas recirculation passage and the recirculation control valve reduces, and the recirculation gas temperature rises to or higher than the deposit generation temperature.

Preferably, it is so constructed that a recirculation gas cooler cools the recirculation gas flowing within the exhaust gas recirculation passage and circulation flow rate regulating means regulates the circulation flow rate of a refrigerant within the recirculation gas cooler. When the recirculation gas temperature is within the deposit generation temperature range, circulation flow rate regulating means is controlled to the low flow rate side to reduce the refrigerant circulation flow rate or stop the refrigerant circulation. Also by this construction, the heat radiation (temperature fall) from the recirculation gas flowing within the exhaust gas recirculation passage and the recirculation control valve reduces, and the recirculation gas temperature rises to or higher than the deposit generation temperature range.

In addition, if the recirculation gas temperature does not rise even when the recirculation gas temperature is raised, the recirculation control valve is fully closed immediately to stop the supply of the recirculation gas (EGR control). As a result, when the recirculation gas temperature rise is intrinsically difficult, such as the case of engine warm-up operation in the winter season, the unreasonable continuation of the EGR control can be prevented.

DETAILED DESCRIPTION OF THE PREFERRED EMBODIMENTS

Figure 1:
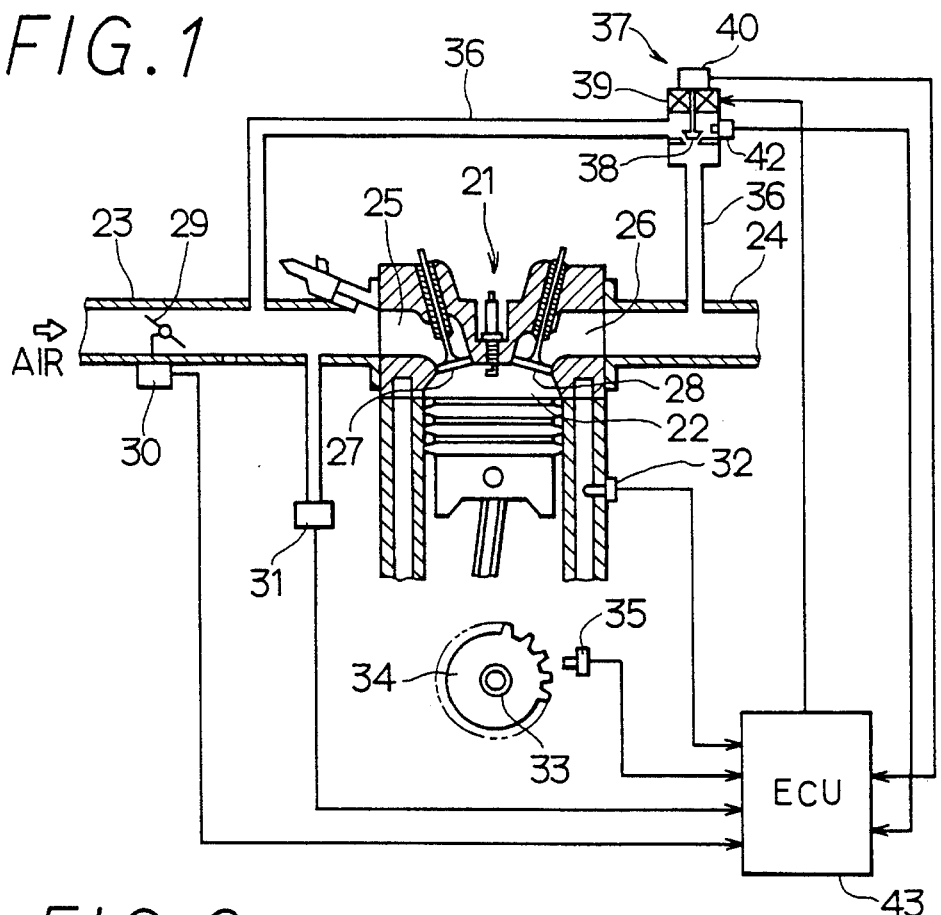
FIG. 1 is a schematic view of an overall construction of an exhaust gas recirculating system according to a first embodiment of the present invention.

The first embodiment according to the present invention will now be described referring to FIGS. 1 through 10. First, the overall system will be described as to the basic construction referring to FIG. 1.

To an engine 21, which is an internal combustion engine, are connected an intake system passage 23 and an exhaust system passage 24 both of which are communicated with a combustion chamber 22. In an intake port 25 and an exhaust port 26 are provided an intake valve 27 and an exhaust valve 28 respectively. On the way within the intake system passage 23 is provided a throttle valve 29 for opening and closing in interlock with the depression amount of an accelerator pedal (not illustrated), and the opening of the throttle valve 29 is detected by a throttle opening sensor 30. Furthermore, on the downstream side from the throttle valve 29 within the intake system passage 23 is provided an intake pressure sensor 31 for detecting the intake pressure.

The engine 21 is provided with a cooling water temperature sensor 32 for detecting the cooling water temperature. An electromagnetic pickup type rotational angle sensor 35 is provided in opposition to a 34 fittingly mounted on a crank shaft 33. From this rotational angle sensor 35 is outputted a pulse signal in synchronization with the rotation of the crank shaft 33. The signals outputted from these sensors 30, 31, 32 and 35 serve to detect the engine operating condition.

On the other hand, to the exhaust system passage 24 is connected an end of an exhaust gas recirculation passage (EGR passage) 36 for recirculating a part of the exhaust gas to the intake system passage 23, and the other end of the EGR passage 36 is connected to the downstream side of the throttle valve 29 within the intake system passage 23. On the way within the EGR passage 36 is provided an exhaust gas recirculation control valve (EGR valve) 37. The EGR valve 37 is of motor-driven type for driving a valve element 38 by using a stepping motor 39 in which the valve opening thereof can continuously and variably be regulated by controlling the drive step of the stepping motor 39. The EGR valve 37 is provided with an EGR valve opening sensor 40 for detecting the valve opening of the EGR valve 37 and an EGR gas temperature sensor (recirculation gas temperature detecting means) 42, such as a thermistor, for outputting a voltage signal according to the recirculation gas (EGR gas) flowing the inside of the EGR valve 37.

Figure 2:
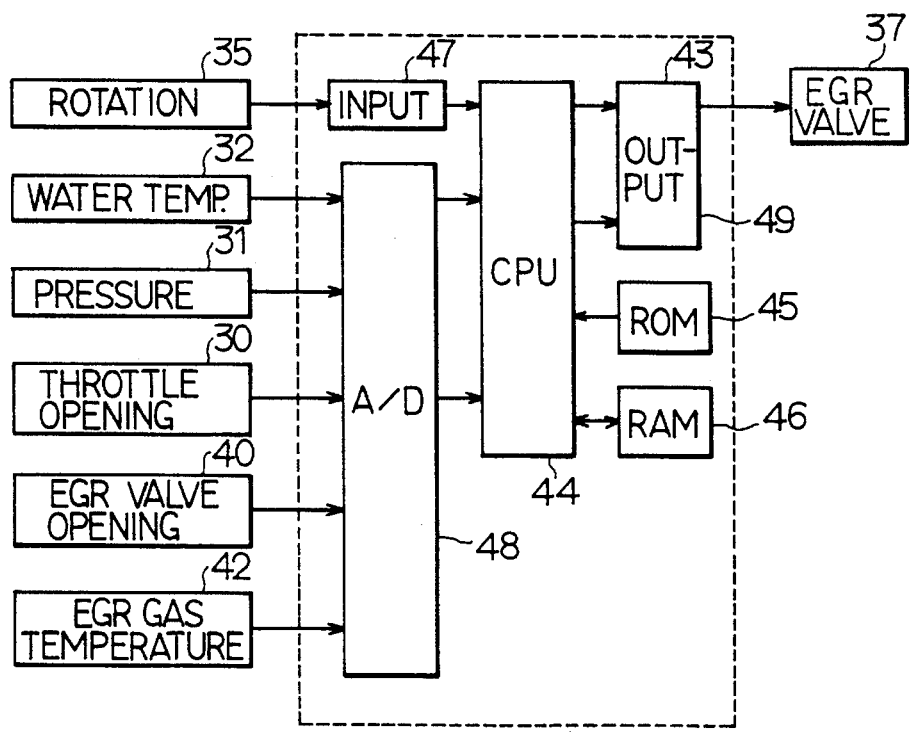
FIG. 2 is a block diagram of the control system illustrating an electric construction thereof.

Next, the construction of an electronic control unit (ECU) 43 for controlling the opening of the EGR valve 37 will be described referring to FIG. 2. The ECU 43 includes a CPU 44, a ROM 45 storing each program (herein described later) in memory, a RAM 46, an input circuit 47, an A/D conversion circuit 48 and an output circuit 49. By reading the output signal from the rotational angle sensor 35 through the input circuit 47, the ECU 43 detects the engine rotational speed NE. Also, based on the respective output signals from the throttle opening sensor 30, the intake pressure sensor 31, the cooling water temperature sensor 32, the EGR valve opening sensor 40 and the EGR gas temperature sensor 42, which are all read through the A/D conversion circuit 48, the ECU 43 detects the throttle opening TA, the intake pressure PM, the cooling water temperature THW, the EGR valve opening VEGRV and the EGR gas temperature (recirculation gas temperature) THG. Accordingly, in this embodiment, the ECU 43 functions as recirculation gas temperature determining means which directly detects the EGR gas temperature THG based on the output signal from the EGR gas temperature sensor (recirculation gas temperature detecting means) 42.

The ECU 43 also functions as recirculation gas temperature rise controlling means which compares the detected EGR gas temperature THG with the upper limit temperature of the deposit generation temperature range, KDPO, within which the accumulation of deposit is facilitated, by executing those programs illustrated in FIGS. 3, 4, 6, 8 and 9, and controls the EGR gas temperature THG to be higher than the deposit generation temperature KDPO when the EGR gas temperature THG is within the deposit generation temperature range. The specific details of the control by the ECU 43 will now be described.

Figure 3:
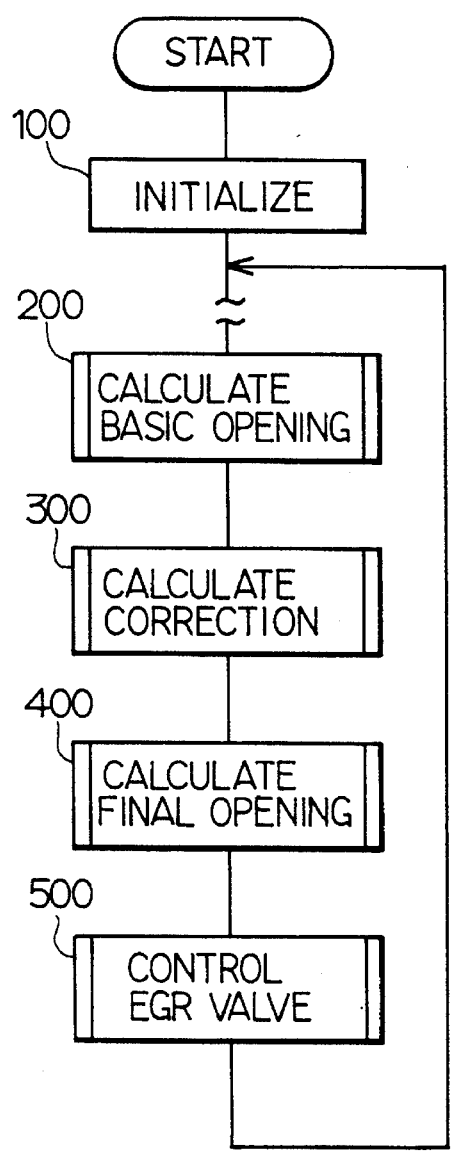
FIG. 3 is a flow chart of a main routine.

The main routine flow will be described along the flow chart given in FIG. 3. When an ignition switch (not illustrated) is turned ON, the RAM 46, etc. are initialized in a step 100. Then, in a step 200, the target EGR valve basic opening SEGRB which is used to achieve the optimum EGR rate (exhaust gas recirculation rate) according to the engine operating condition is calculated. After this, in a step 300, the EGR gas temperature correction value FTHG is calculated according to the EGR gas temperature THG. In a step 400, the final target EGR valve opening SEGR is calculated. Then, in a step 500, the signal of the target EGR valve opening SEGR calculated in the step 400 is outputted to the stepping motor 39 of the EGR valve 37 through the output circuit 49, and the EGR valve 37 is controlled so that the actual valve opening can agree with the target EGR valve opening SEGR. The above steps 200 through 400 are executed every 40 ms, and the step 500 is executed every 4 ms.

Figure 4:
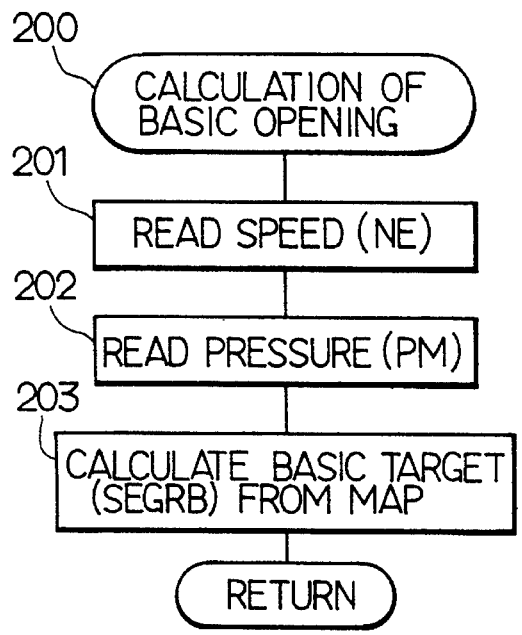
FIG. 4 is a flow chart of a target EGR valve basic opening calculation routine.
Figure 5:
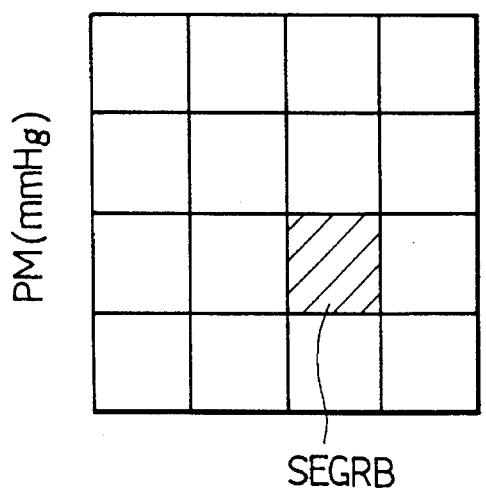
FIG. 5 is a table illustrating a target EGR basic opening SEGRB for realizing the optimum EGR rate by the use of rotational speed of engine NE and intake pressure PM.

Here, the details of the step 200 (target EGR valve basic opening calculation routine) will be described based on FIG. 4. In this routine, firstly, in a step 201, the signal of the engine rotational speed NE outputted from the rotational angle sensor 35 is read. In the following step 202, the signal of the intake pressure PM outputted from the intake pressure sensor 31 is read. Then, in a step 203, using the engine rotational speed NE and the intake pressure PM as parameters and referring to a map given in FIG. 5, the target EGR valve basic opening SEGRB for achieving the optimum EGR rate according to the engine operating condition is calculated. Then, this routine is terminated, and the process proceeds to the step 300 (EGR gas temperature correction value calculation routine) illustrated in FIG. 3.

Figure 6:
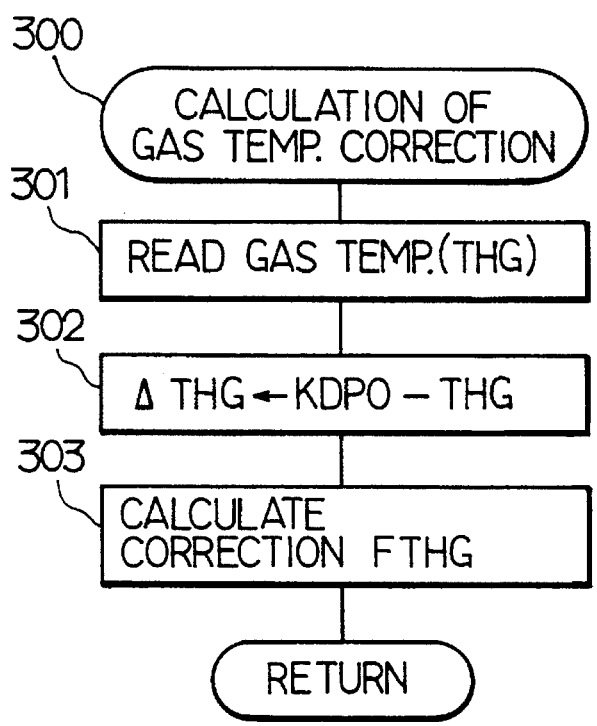
FIG. 6 is a flow chart for an EGR gas temperature correction value calculation routine.
Figure 7:
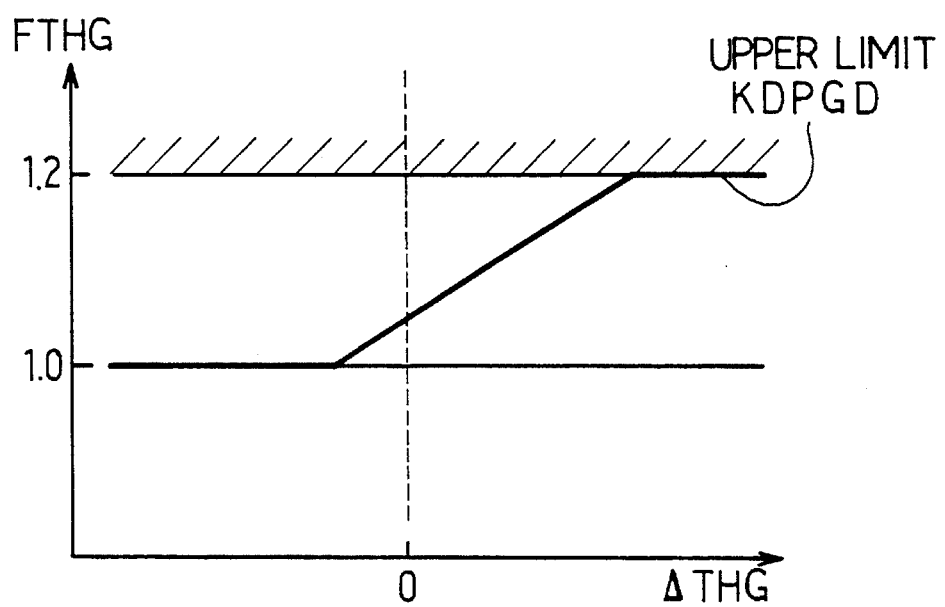
FIG. 7 is a graph illustrating the correlation between an EGR gas temperature correction value FTHG and a difference ΔTHG.

The details of this step 300 (EGR gas temperature correction value calculation routine) are illustrated in a flow chart given in FIG. 6. In this routine, first of all, in a step 301, the signal of the EGR gas temperature THG outputted from the EGR gas temperature sensor 42 is read. In a step 302, the difference between an upper limit value of the deposit generation temperature range, KDPO (e.g., 110° C.), above which deposit accumulation is facilitated, and the actual EGR gas temperature THG as $\Delta$THG. Then, in a step 303, using $\Delta$THG as a parameter and referring to a FTHG table given in FIG. 7, the EGR gas temperature correction value FTHG corresponding to $\Delta$THG is calculated, and this routine is terminated.

Here, the characteristics of the EGR gas temperature correction value FTHG are such that when the EGR gas temperature THG falls below the upper limit value of the deposit generation temperature range, KDPO, as the deposit largely accumulates within the EGR valve 37, the EGR gas temperature correction value FTGH serves to increase the recirculation gas flow rate (EGR flow rate) and raise the EGR gas temperature THG. That is, by regulating the EGR flow rate, the EGR gas temperature correction value FTHG corrects the loss (heat radiation) in the EGR gas temperature within the EGR valve 37 and the piping of the EGR passage 36.

Figure 8:
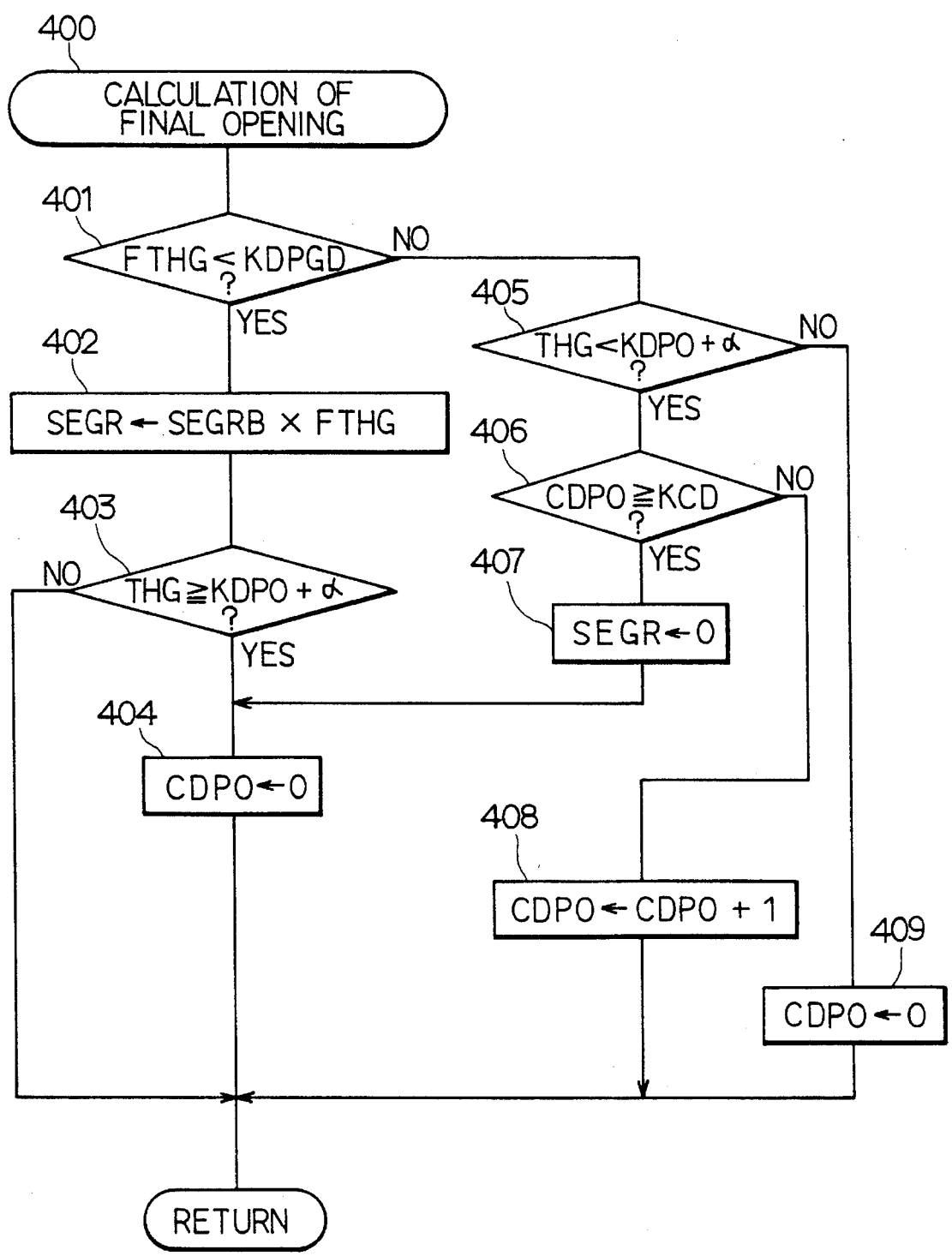
FIG. 8 is a flow chart for a target EGR valve opening calculation routine.

Next, by using a flow chart given in FIG. 8, the target EGR valve opening calculation routine (step 400) will be described. In a step 401, whether or not the EGR gas temperature correction value FTHG is smaller than the upper limit guard value KDPGD is determined. If FTHG<KDPGD, as the opening correction amount of the EGR valve 37 can still be opened, the process proceeds to a step 402. In the step 402, the target EGR valve opening SEGR is calculated by the multiplication of the target EGR valve basic opening SEGRB by the EGR gas temperature correction value FTHG. Subsequently, in a step 403, whether or not the EGR gas temperature THG has risen to the temperature equal to or higher than the upper limit value of the deposit generation temperature range, KDPO+temperature allowance $\alpha$, is determined. If THG<KDPO+$\alpha$, this routine is terminated without any further processing. If it is determined in the step 403 that THG$\geq$KDPO+$\alpha$, the process proceeds to a step 404 and the temperature rise control time counter CDPO is cleared to "0." That is, hereafter a control to raise the EGR gas temperature THG is not executed unless THG<KDPO+$\alpha$.

On the other hand, if it is determined that the EGR gas temperature correction value FTHG is equal to or larger than the upper guard value KDPGD in the step 401, the process proceeds to a step 405. In the step 405, the EGR gas temperature THG are compared with the KDPO+$\alpha$, and if THG<KDPO+$\alpha$, the process proceeds to a step 406, and whether or not the temperature rise control time counter CDPO has reached to the preset time KCD is determined. If the temperature rise control time counter CDPO has reached the preset time KCD, the process proceeds to a step 407. In the step 407, the target EGR valve opening SEGR is set to "0" and the EGR valve 37 is fully closed immediately. In other words, even if the temperature rise control is executed for the preset time KCD, unless the EGR gas temperature THG reaches KDPO+$\alpha$, as the engine 21 is set to such an operation range that the EGR gas temperature THG can not rise to or higher than the deposit generation temperature range (operation range in which the rise of the EGR gas temperature THG is difficult, such as engine warm-up operation in the winter season) even if the EGR flow rate is corrected to the maximum. In this case, the EGR valve 37 is fully closed immediately, and the EGR control is stopped.

In contrast, if it is determined that the temperature rise control time counter CDPO has not reached the preset time KCD in the step 406, the process proceeds to a step 408. In the step 408, the temperature rise control time counter CDPO is incremented only by "1," the temperature rise control time is measured, and the temperature rise control is continued.

On the other hand, if it is determined that the EGR gas temperature THG has reached to KDPO+$\alpha$ in the step 405, the process proceeds to the step 409. In the step 409, the temperature rise control time counter CDPO is cleared to "0." That is, hereafter a control to raise the EGR gas temperature THG is not executed unless THG<KDPO+$\alpha$ is established.

Figure 9:
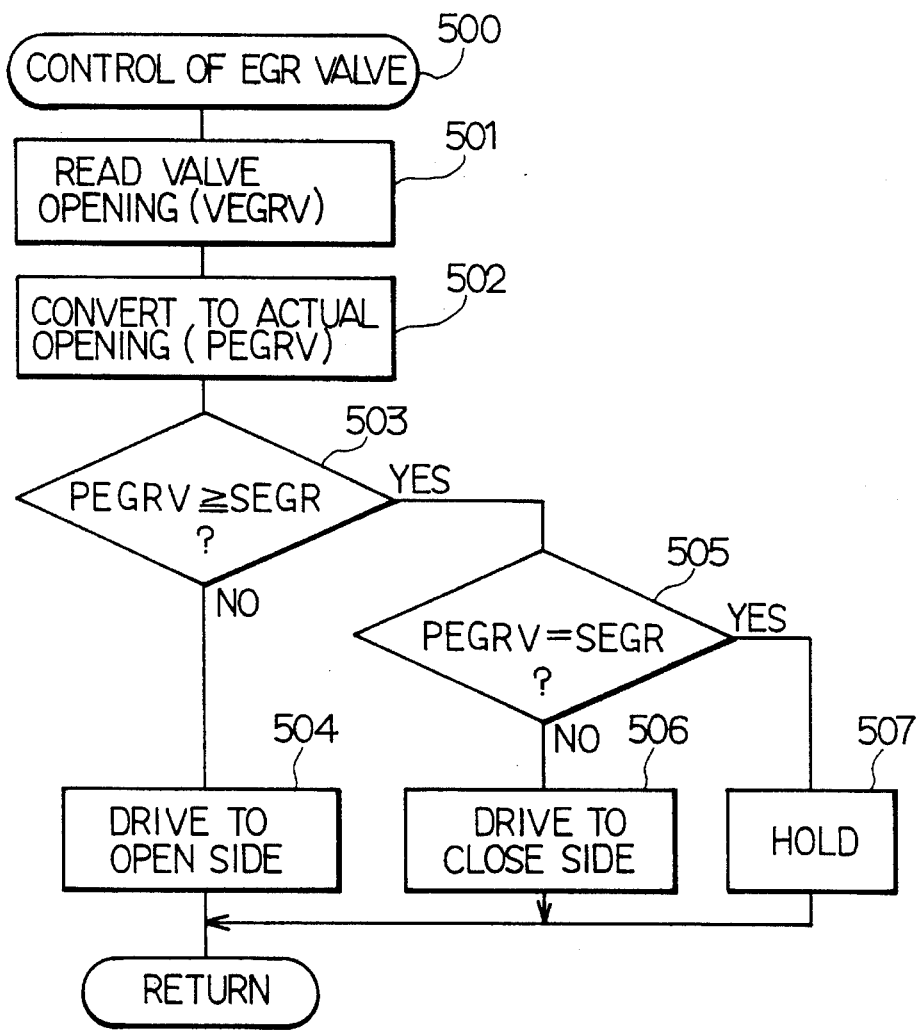
FIG. 9 is a flow chart for an EGR valve drive routine.
Figure 10:
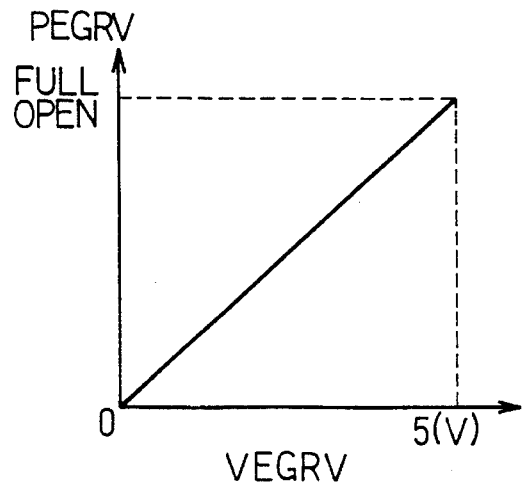
FIG. 10 is a graph illustrating the correlation between an EGR valve opening sensor output VEGRV and an actual EGR valve opening PEGRV.

Now, an EGR valve driving routine (step 500) will be described by using a flow chart in FIG. 9. In the beginning, in a step 501, the signal VEGRV outputted from the EGR valve opening sensor 40 is read to grasp the current opening of the EGR calve 37. Then, in a step 502, the EGR valve opening sensor output VEGRV is converted to the actual EGR valve opening PEGRV by referring to a conversion table given in FIG. 10 so as to be agreed with the target EGR valve opening unit. Following this, in a step 503, the actual EGR valve opening PEGRV is compared with the target EGR valve opening SEGR. If the actual EGR valve opening PEGRV is smaller than the target EGR valve opening SEGR, the process proceeds to a step 504, and the EGR valve 37 is driven to the OPEN side by 1LSB.

On the other hand, in the step 503, if it is determined that the actual EGR valve opening PEGRV is equal to or larger than the target EGR valve opening SEGR. the process proceeds to a step 505. In the step 505, whether or not the actual EGR valve opening PEGRV agrees with the target EGR valve opening SEGR is determined. If the determination is positive, the opening of the EGR valve 37 is held with the then opening (step 507), and if the determination is negative, that is, the actual EGR valve opening PEGR is equal to or larger than the target EGR valve opening SEGR, the process proceeds to a step 506, and the EGR valve 37 is driven to the CLOSE side by 1LSB. The processing described above aims that the EGR flow rate is corrected to raise the EGR gas temperature THG to the temperature equal to or higher than the upper limit value of the deposit generation temperature range, KDPO+the temperature allowance α, by the drive of the EGR valve 37 to the OPEN or CLOSE side by 1LSB so that the actual EGR valve opening PEGRV can agree with the target EGR valve opening SEGR and having the actual EGR valve opening PEGRV follow the target EGR valve opening SEGR.

According to the first embodiment described above, the temperature of the recirculation gas (EGR gas) flowing within the EGR passage 36 is detected by the EGR gas temperature sensor 42, and if the detected EGR gas temperature is within the deposit generation temperature range in which the accumulation of deposit is facilitated, the opening of the EGR valve 37 is corrected to the OPEN side to increase the EGR flow rate, and thereby the temperatures of the inside wall of the EGR passage 36 and the EGR valve 37 are quickly raised. This temperature rise control can reduce the heat radiation (temperature fall) of the EGR gas flowing through the EGR passage 36 and EGR valve 37, raise the EGR gas temperature equal to or higher than the deposit generation temperature, and minimize the accumulation of deposit on the inside wall of the EGR passage 36, the valve element 38 of the EGR valve 37, etc. As a result, the conventional speed reduction control valve is no longer necessary, and thereby the demand for the simplified and compact construction can be satisfied. Furthermore, in the EGR control within a low water temperature range, the EGR gas temperature rise control can effectively restrain the accumulation of deposit, expand the EGR control range, and obtain the nitrogen oxides emission reduction effect.

Also, in the first embodiment, if the EGR gas temperature does not rise even when the control is executed to raise the EGR gas temperature, such as the case under the engine warm-up operation in the winter season, or if the engine operation range is such that the EGR gas temperature can not be raised to or higher than the deposit generation temperature range even if the EGR flow rate is corrected to the maximum, the EGR valve 37 is fully closed immediately and the EGR control is stopped. As a result, the unneccesary continuation of the EGR control can be prevented in the operation range within which the EGR gas temperature rise is difficult, and thereby the reliability of the control characteristics within the low water temperature range can be improved.

Furthermore, in the first embodiment, as the EGR flow rate is increased by the correction of the opening of the EGR valve 37 to the OPEN side as EGR gas temperature raising means, an advantage is that the EGR gas temperature can be managed by the use of EGR control system which controls the opening of the EGR valve 37.

Figure 11:
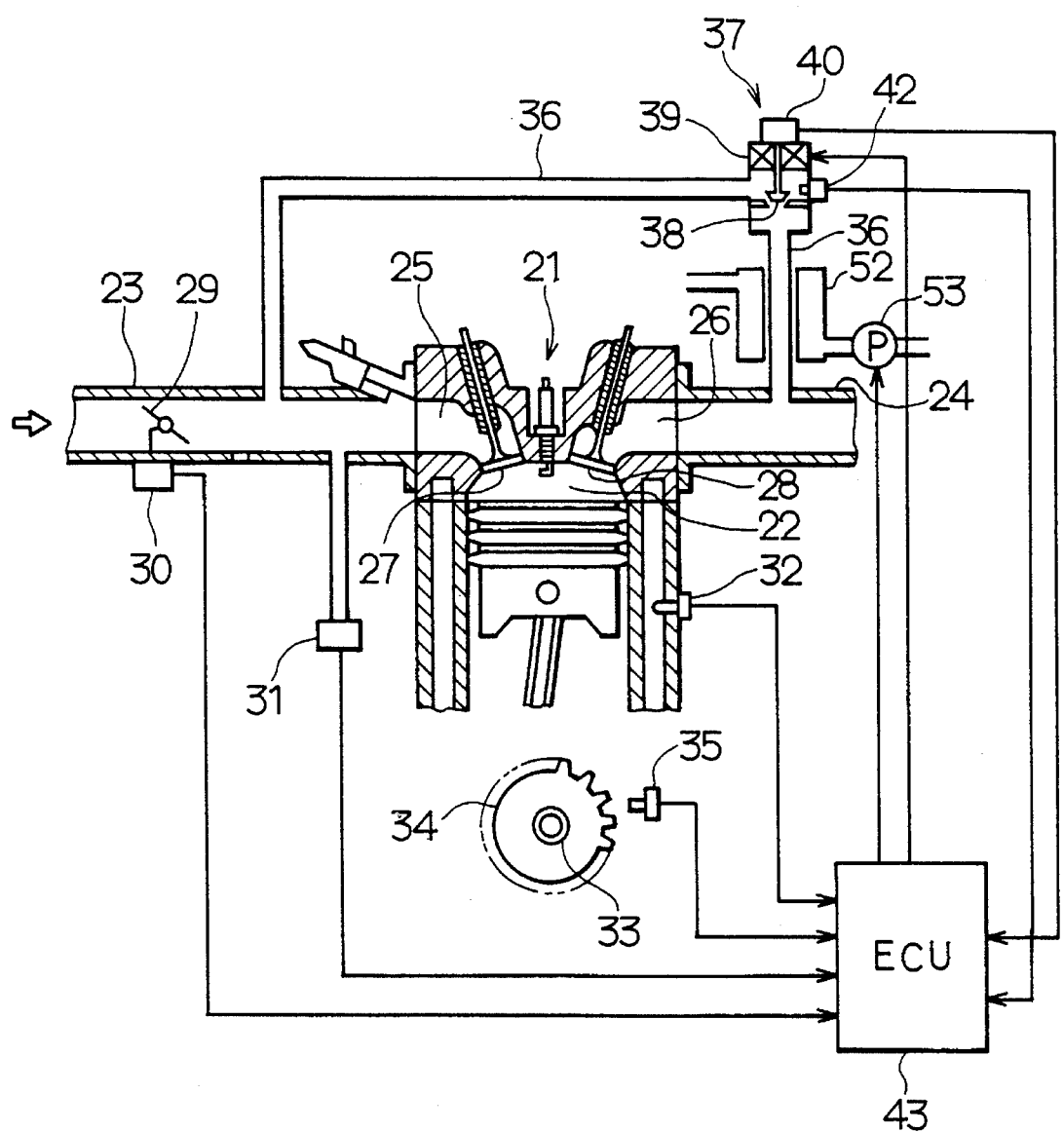
FIG. 11 is a schematic view of the overall construction of the system according to a second embodiment of the present invention.

However, the EGR gas temperature raising means should not be limited to the opening correction of the EGR valve 37 but may be constructed like the second embodiment of the present invention illustrated in FIG. 11. Specifically, the second embodiment is so constructed that a recirculation gas cooler (EGR gas cooler) 52 is provided on the upstream side from the EGR valve 37 within the EGR passage 36 (i.e., on the side of the exhaust gas system passage 24), and the circulation flow rate of the refrigerant, such as cooling water, circulating within the EGR gas cooler 52 is controlled by a pump 53 which is circulation flow rate regulating means, and thereby the heat radiation (temperature fall) of the EGR gas within the EGR passage 36 is managed.

In this second embodiment, when the EGR gas temperature is within the deposit generation temperature range, the rotational speed of the pump 53 is corrected to the side of low flow rate (i.e., low rotational speed side) by the ECU 43 (recirculation gas temperature rise controlling mans). As a result, the heat radiation (temperature fall) of the EGR gas within the EGR passage 36 can be reduced, the EGR gas temperature can be raised to or higher than the deposit generation temperature, and the accumulation of deposit on the inside wall of the EGR passage 36, the valve element 38 of the EGR valve 37, etc. can be restrained.

It should be noted that in the second embodiment, although the pump 53 is used as the circulation flow rate regulating means, a solenoid valve, for example, may be used, and by controlling the ON/OFF time (OPEN/CLOSE time) of the solenoid valve, the effect equivalent to the second embodiment can be obtained. Furthermore, it is needless to say that when the EGR gas temperature is within the deposit generation temperature range, the circulation of the refrigerant may completely be stopped by the stop of the pump 53 (or the closing of the solenoid valve).

In the first and second embodiments described above, as the EGR gas temperature sensor 42 is provided within the EGR valve 37 from the viewpoint of reducing the deposit accumulation particularly on the valve element 38 within the EGR valve 37, etc., an advantage is that temperature control (deposit restraint) within the EGR valve 37 can exactly be executed. It is of course possible that the EGR gas temperature sensor 42 may be provided to any other part within the EGR passage 36.

Furthermore, in the first and second embodiments, as the EGR gas temperature is directly detected based on the output signal from the EGR gas temperature sensor 42, an advantage is that the precision of the EGR gas temperature detection can be improved. However, as the EGR gas temperature varies according to the engine operating condition, such as rotational speed, intake pressure and cooling water temperature, and the opening of the EGR valve 37, if the correlations between these factors are obtained beforehand through experiments or theoretical analysis, it is possible to estimate the EGR gas temperature from the operating condition of the engine 21, such as rotational speed, intake pressure and cooling water temperature, and the opening of the EGR valve 37.

Therefore, it is not always necessary for the present invention to provide the EGR gas temperature sensor 42 (recirculation gas temperature detecting means), and it is acceptable that the engine operating condition, such as rotational speed, intake pressure and cooling water temperature, is detected by the respective sensors 35, 31 and 32 and the EGR gas temperature is estimated from the detected data and the opening of the EGR valve 37. That is, the step 301 in FIG. 6 may be modified not to read the detected actual temperature THG but to use the estimated temperature as THG. In this construction, as the data for use in the control of the engine 21 can be used as the data of the engine operating condition, such as rotational speed, intake pressure and cooling water temperature, there is no need to provide any additional sensor or the EGR gas temperature sensor 42 (recirculation gas temperature detecting means), and the manufacturing cost reduction can be realized for this much saving.

Moreover, the present invention may be embodied by a combination of the control according to the first embodiment and the control according to the second embodiment. That is, when the EGR gas temperature is within the deposit generation temperature range, the opening of the EGR valve 37 is corrected to the OPEN side to increase the EGR flow rate, and concurrently, the circulation flow rate regulating means, such as the pump 53, is corrected to the low flow rate side (i.e., low rotational speed side) to reduce the refrigerant circulation flow rate. As a result, the EGR gas temperature rise effect can be improved.

In addition to the above, the present invention may be embodied by the use of a means for variably driving the opening of the EGR valve 37 instead of the stepping motor 39, such as linear solenoid and servo motor. Also, the scope of the present invention should not be limited to the gasoline engine but can be applied to diesel engine. It is needless to say that the present invention may be embodied in many other forms without departing from the spirit or the scope of the invention.

What is claimed is:

1. An exhaust gas recirculating system comprising:

an exhaust gas recirculation passage for recirculating a part of exhaust gas from an exhaust system of an internal combustion engine to an intake system;

a recirculation control valve provided on the way within the exhaust gas recirculation passage for regulating recirculation gas flow rate according to engine operating conditions;

recirculation gas temperature determining means for determining a temperature of recirculation gas flowing within the exhaust gas recirculation passage; and recirculation gas temperature rise controlling means for controlling a recirculation gas temperature to higher than a predetermined deposit generation temperature when the recirculation gas temperature determined by the recirculation gas temperature determining means is below the deposit generation temperature, thereby reducing an accumulation of exhaust gas deposit in the exhaust gas passage.

2. The exhaust gas recirculating system according to claim 1, wherein the exhaust gas temperature detecting means includes:

recirculation gas temperature detecting means provided within the exhaust gas recirculation passage for outputting a signal according to an actual recirculation gas temperature.

3. The exhaust gas recirculating system according to claim 1, wherein the exhaust gas temperature determining means includes:

estimating means for estimating, from engine operating conditions and an opening of the recirculation control valve, the temperature of the recirculation gas.

4. The exhaust gas recirculating system according to claim 1, wherein:

the recirculation gas temperature rise controlling means raises the recirculation gas temperature by increasing a recirculation gas flow rate by correcting the opening of the recirculation control valve to an OPEN side.

5. The exhaust gas recirculating system according to claim 1, further comprising:

a recirculation gas cooler for cooling the recirculation gas flowing within the exhaust gas recirculation passage; and circulation flow rate regulating means for regulating a circulation flow rate of a refrigerant within the recirculation cooler, wherein the recirculation gas temperature rise controlling means raises the recirculation gas temperature by operating the circulation flow rate regulating means to a low flow rate side and reducing the circulation flow rate of the refrigerant.

6. The exhaust gas recirculating system according to caim 1, wherein:

the exhaust gas temperature rise controlling means fully closes the recirculation control valve immediately if the recirculation gas temperature does not rise even when the recirculation gas temperature rise control is continued.

\* \* \* \* \*